ns Patent Office  3,392,765
Patented July 16, 1968

3,392,765
LATHE CHARGER
Byron B. Brookhyser, Milton, and Harold E. Erickson, Federal Way, Wash., assignors to Weyerhaeuser Company, Tacoma, Wash., a corporation of Washington
Filed May 2, 1966, Ser. No. 546,909
8 Claims. (Cl. 144—209)

This invention relates to an apparatus for centering articles having a substantially circular cross-section and in particular to an apparatus for positioning logs into axial alignment with spindle means of a lathe used to peel the logs into veneer.

Since prime peeler logs having a diameter in excess of 30" are becoming more and more scarce and the plywood market is constantly expanding, it has become necessary to use logs having a diameter of as little as 8" to produce the veneer necessary to fill the market demands. Thnus it is seen that it requires several more logs having smaller diameter to produce the same quantity of veneer as was required when larger diameter logs were more readily available. This means that the peeling lathe must be loaded three or more times with small diameter logs to produce the same quantity of veneer that is obtainable with one loading of a larger diameter log. This excess time for loading of the individual smaller logs results in a considerable reduction in the amount of time that logs are actually being peeled in the lathe. It is therefore necessary to provide an apparatus for accurately and quickly loading or charging a plywood lathe so that it can be peeling logs the maximum amount of time possible.

Since logs are rarely perfectly circular in cross-section and are generally tapered from end to end, it is necessary, in order to obtain the maximum yield from any one log, to axially position it in the peeling lathe so that the axis of the peeling lathe is coincident with the axis of the maximum right cylinder of the log. This requires an apparatus which can center one end portion of the log independent from the centering of the other end portion.

As disclosed in the United States patent to Sjostrom (No. 1,646,115), it is not new to provide an apparatus for centering a log in a plywood peeling lathe with such an apparatus providing means for independently centering the two ends of the log to accommodate for its taper. It is noted, however, that such an apparatus requires that the peeling lathe be inoperative all of the time that it takes to center the log in it. Other log centering means which require the lathe to stop peeling during the time the log is being centered are disclosed in the patents to Bukowsky (No. 2,352,885) and to Hervey (No. 2,670,772).

The concept of remotely centering the log using a transfer system for positioning the precentered log in the lathe is disclosed in the patents to Forman (No. 2,523,-563) and to Johnson (No. 2,912,024). It is noted, however, that in both of these mechanisms there is a reliance on rails and wheeels which must be accurately maintained so that the precentered position coincides with the axis of the lathe when the transfer mechanism moves from the precentering position to the lathe charging position.

A Finnish lathe charger is known which comprises a "U" shaped frame which supports three pivotable grasping arms which precenter the log which is dropped through the open end of the "U" shaped frame. The arms hold the log at one contact point near the bottom of the frame and at two side points approximately 90° about the surface of the log either direction from the bottom contact point. The whole frame is supported by pivotable slide members which translate and pivot the frame approximately 90° so that the center of the precentered log is coincident with the axis of the lathe. At this point the lathe spindles are inserted into the ends of the log, the arms are released and the frame is returned to its original position. While this charger provides remote precentering, it has three disadvantages which limit its usefulness for high charging rates. The first is the fact that the logs are centered without reference to the shape of about half of their circumference. Secondly, the pivot and slide mechanism is subjected to wear, which results in poor accuracy in alignment. The third disadvantage is the fact that the speed of operation is limited by the fact that the log is loaded and charged through the same side of the frame.

It is therefore an object of this invention to provide a generally improved lathe charger which reduces or eliminates the inaccuracies due to insufficient spread of log contacts as well as those due to wear and misalignment of slides and rails with an increase of operating speed, design simplicity, and operating convenience.

It is another object of this invention to provide a remotely positioned log centering apparatus which at a loading station is properly positioned to load logs which enter the apparatus in the same direction as they are moved in and charged from the apparatus as it is moved to the lathe charging position, so that the lathe can be operating in the cutting mode a maximum amount of time.

It is a further object of this invention to provide an apparatus for centering substantially circular cross-sectioned objects with three contact points, each point being positioned approximately 120° along the circumference of the article from the adjacent contact points.

Other objects of this invention will be apparent from the following description and accompanying drawings.

Figure 1:
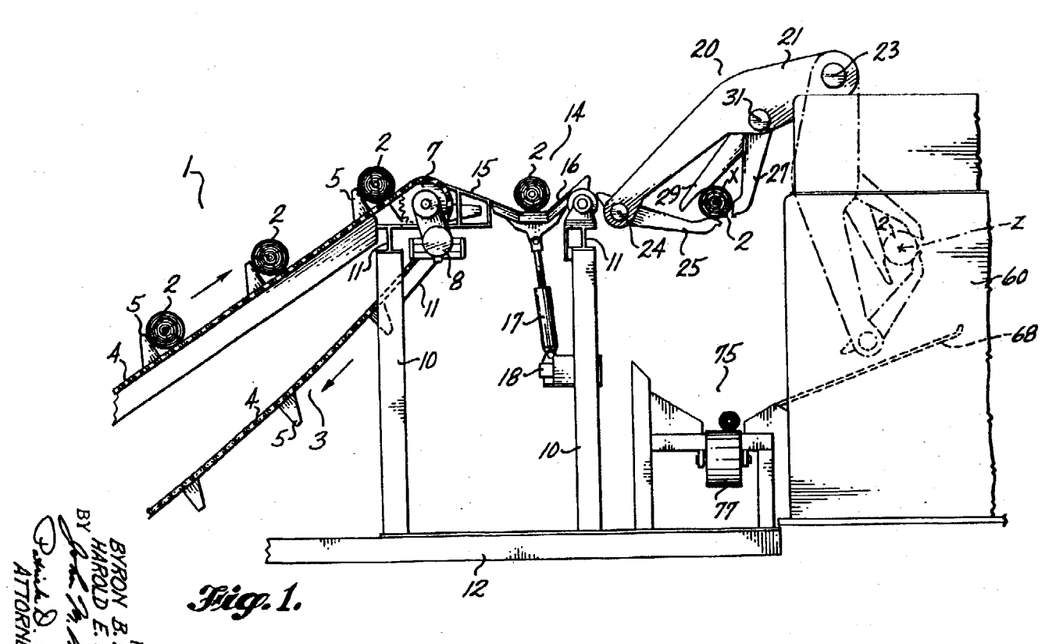
FIGURE 1 is a diagrammatic side view of the log centering and lathe charging machine illustrative of the invention.

One suitable arrangement utilizing the improved lathe charging apparatus is shown in FIGURE 1 and includes a log feeder 1, a cradle transfer 14, a lathe charger 20, a peeling lathe 60, and a core handling assembly 75.

The log feeder assembly 1 conveys the logs 2 from a source (not shown) along an incline conveyor 3 which supports a continuous chain 4 which has spaced along its length lugs 5 for supporting the logs 2. The chain 4 is moved along the incline conveyor 3 in the direction as shown by the arrows by means of the drive sprocket 7 which is powered by suitable drive means 8. The incline conveyor 3 is supported upon cross-brackets 11 and upright supports 10 which in turn are supported upon a foundation 12.

With continued reference to FIGURE 1, there is shown the cradle transfer mechanism 14 which receives logs 2 as they slide down a cradle slide 15 adjacent the highest part of the inclined conveyor 3 into the cradle 16. At this point an end evener (not shown) may be used to position the logs axially along the cradle 16 so that they will be in proper position in alignment with subsequent handling equipment. The cradle 16, through the operation of cradle motor 17 which is attached at one end to the cradle 16 and at the other end to a motor bracket 18 on upright support 10, is movable about cradle pivot 19 to move between the log receiving position as shown in the solid lines in FIGURES 1 and 4 to the feeding position, shown in dash lines in FIGURE 4, to transfer the log 2 from the cradle 16 to the lathe charger 20.

The lathe charger 20 includes side plate 21 which is pivotally attached to the lathe 60 by means of the main pivot shaft 23. Pivotally attached to plate 21 through the secondary pivot shaft 24 is a first caliper arm 25. A second caliper arm 27 and a closing arm 29 are likewise pivotally attached to plate 21 by means of the closing pivot shaft 31. Shafts 23, 24 and 31 are all parallel to the lathe axis Z. The lathe charger 20 moves about the main pivot shaft 23 from the position, shown in solid lines in FIGURE 1, for receiving the log 2 and centering it about the axis X to the lathe loading position shown in dash lines where the log axis X becomes coincident with the lathe axis Z. When the log has been peeled to its smallest useful diameter, it is referred to as a "core." This core is released from the lathe and drops from the peeling position down onto a core chute 68 which guides it into a core handling assembly 75 which may include a core conveyor 77 for conveying the core to another converting station to be made into dimension lumber, chips or some other useful by-product.

One of the major improvements in the operation of this precentering mechanism is its increased accuracy in centering a circular cross-sectioned object. While virtual precision in centering is well known in the machine tool industry by use of a conventional three-jaw chuck, such precision is not required in the handling of many articles, such as logs which are rarely of a true circular cross-section. However, by the instant centering mechanism the accuracy of a three-jaw chuck is nearly approached. This results from the gripping of the circular object at three points which are separated around the object's circumference by approximately 120° from the adjacent points in either direction. This is best described with reference to FIGURE 2, wherein the method of constructing and positioning the first and second caliper arms 25 and 27 with the closing arm 29 is disclosed.

Figure 2:
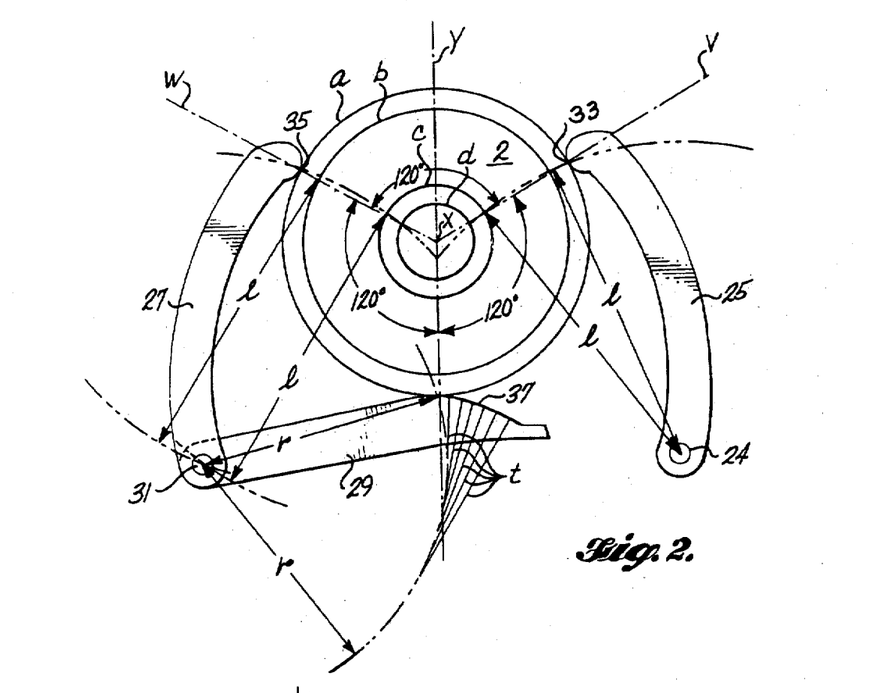
FIGURE 2 is a diagrammatic side view illustrating how the article centering arms function with either large or small diameter objects.

As shown in FIGURE 1, a standard axis X is established parallel to, but initially remote from, the lathe axis Z. With reference to FIGURE 2 a standard line Y is shown as a vertical line passing through the axis X. Emanating outwardly from the standard axis X are first and second caliper lines V and W which are separated from one another and from the lower extension of line Y by 120°.

A series of circles representing circular objects is drawn with the standard axis X as their center. The first of these, $a$, represents the maximum size of article to be centered by the particular structure. The circle $b$ represents a high mean diameter of such objects, and the circle $c$ represents a low mean of the diameter of such objects to be centered. The circle $d$ represents the minimum diameter object to be centered by the mechanism.

Depending upon the accuracy required, the length of the caliper arms 25 and 27 can be arbitrarily chosen. If extreme accuracy is required, then the length of the arms must be quite long in comparison to the maximum diameter of the circular objects to be centered. In the example shown in FIGURE 2 the effective length of the caliper arms 25 and 27 is equal to 1 which, in this case, is also equal to the diameter of the largest article to be centered, that is, the diameter of the circle $a$. The effective length of arms 25 and 27 is the distance between their axes of rotation, pivots 24 and 31, and their point of contact with the circular objects, first caliper contact point 33 and second caliper contact point 35. The pivot point 24 is established as the point of crossing of an arc of 1 length from the point where the circle $b$ crossed the first caliper line V and the arc of 1 length taken from the point where the circle $c$ crosses the first caliper line V. As caliper arm 25 rotates from circle $a$ to circle $d$ its contact point 33 describes a line which is substantially 120° away from the standard line Y emanating downwardly from the standard axis X. A similar method is used in positioning the closing pivot shaft 31 using the points where the circles $b$ and $c$ cross the second caliper lines W. With this construction it is possible through a gear train or linkages, such as shown in FIGURES 4 through 8 and later to be described, to move caliper arms 25 and 27 at the same rate so that at any one position of the contact point 33 it is an identical distance away from the standard axis X as is the second caliper point 35 on the second caliper arm 27.

With continued reference to FIGURE 2, the closing arm 29 provides the function of supporting the circular object 2 at a point along its circumference approximately 120° in either direction separated from the contact points 33 and 35 of the caliper arms 25 and 27. To accomplish this result it is necessary that the contacting surface 37 of the closing arm 29 be contoured so that as any circular object 2 is positioned between the arms 25, 27 and 29, it will become centered about the standard axis X, and the distances between X and the contact points 33, 35 and the surface 37 along the standard line Y are equal. The surface 37 can be developed using well known cam construction practices to virtually eliminate any inaccuracy caused by the curvature of the paths of contact points 33 and 35. However, adequate precision is obtained when the surface 37 is generated in the same way that an involute gear tooth is generated, except that it has a 0° pressure angle. This is shown by the series of tangents $t$ which are unwound about the radius of a construction circle having a radius $r$, the end of which describes the contour of surface 37.

Figure 3:
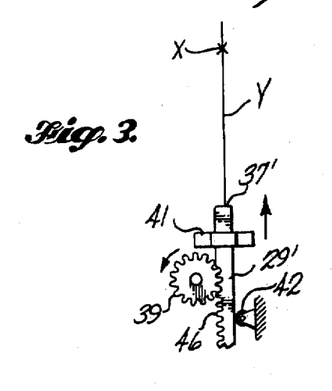
FIGURE 3 is a diagrammatic view of a modified embodiment of the closing contact apparatus.

Another embodiment of this centering assembly is shown in FIGURE 3 wherein the contacting surface 37' of the closing element 29' is positioned along the standard line Y by means of a pinion gear 39 which operates through a rack 40 to position the closing means 29' as it is guided by guides 41 and 42. The pinion gear 39 operates at a speed and direction which is proportional to the speed and direction of motion of the caliper arms 25 and 27, so that the distance between the contact point 37' and the standard axis X is equal to the distance between the standard axis X and the caliper contact points 33 and 35.

It is therefore seen from the foregoing description that it is possible to accurately center articles having a range of diameters about a standard axis X by means of arms and contacting surfaces which operate in such a manner that the articles are held at three points which are separated along the circumference of the objects by approximately 120°. The contact points and surfaces move with relation to one another so that for any size circle, the distance between the standard axis X and the contact points is equal.

Figure 4:
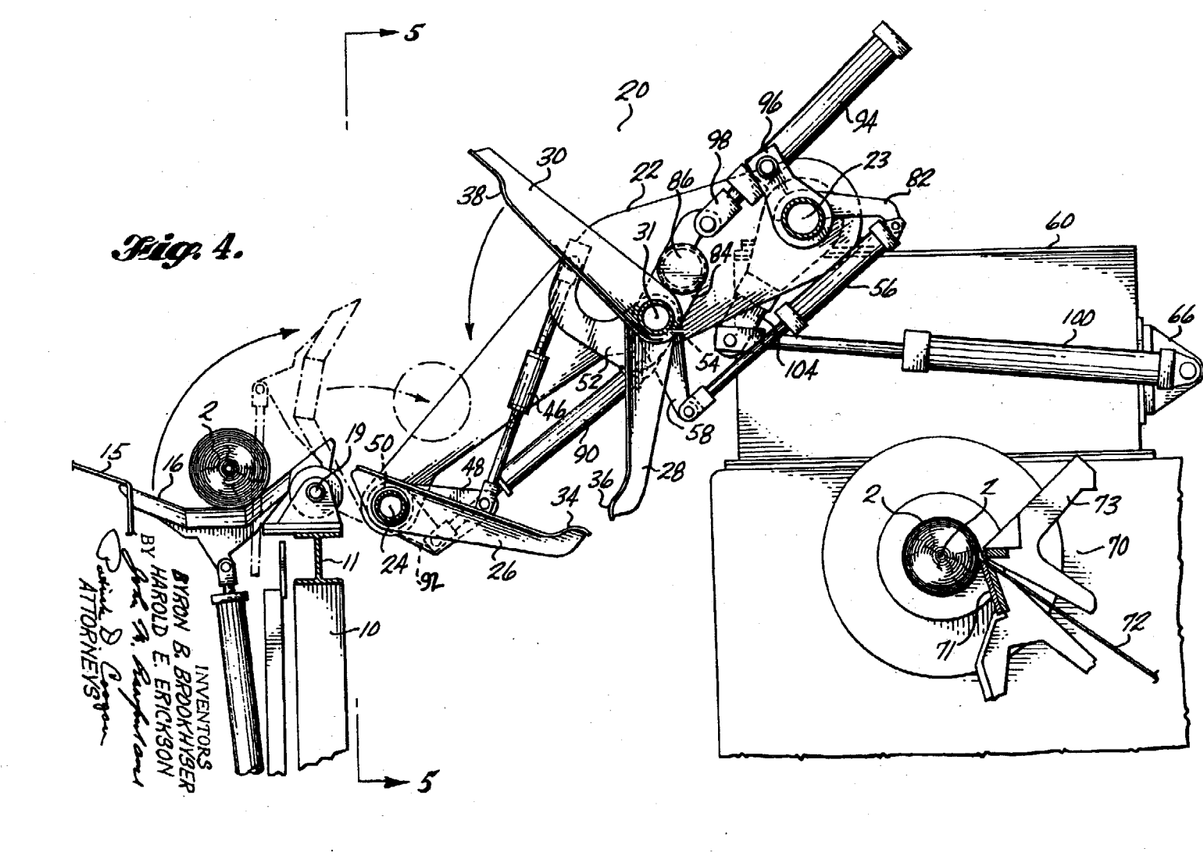
FIGURE 4 is a side elevation view partially in section with some parts removed for clarity illustrating the lathe charging apparatus in the log receiving or loading position.
Figure 5:
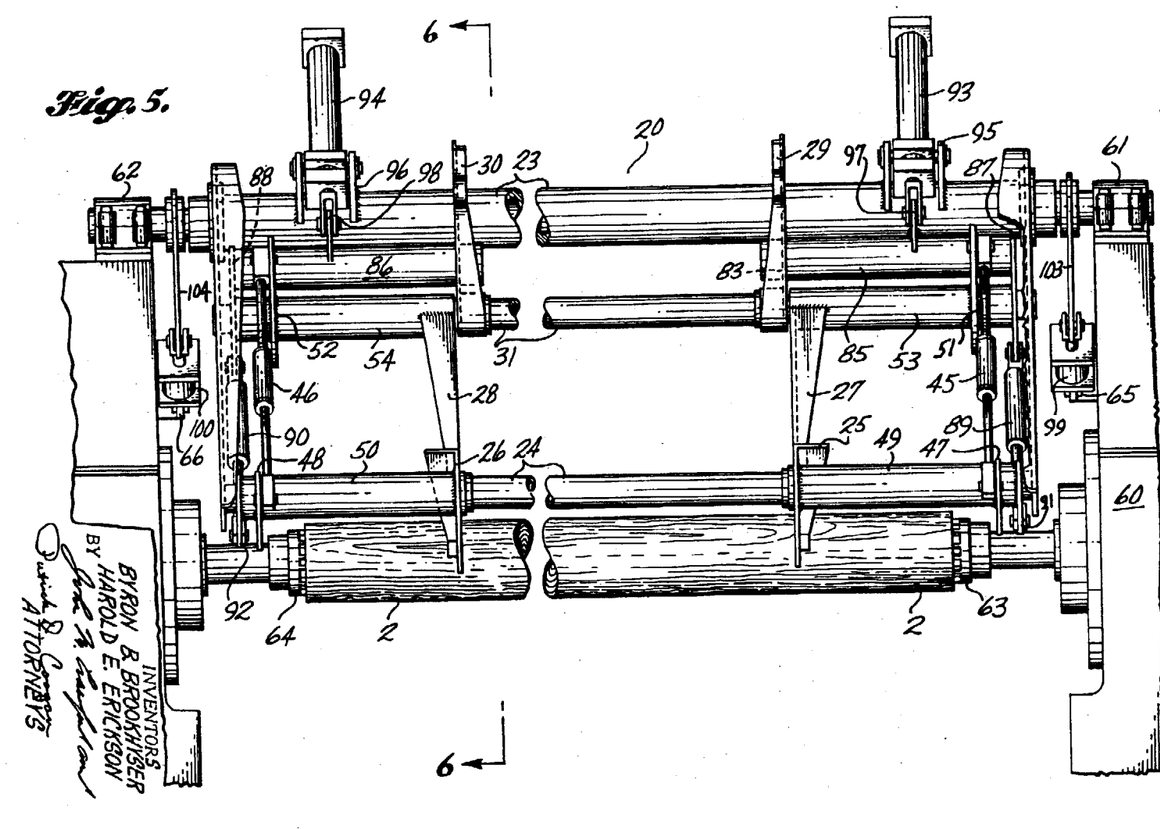
FIGURE 5 is an end elevation view taken through lines 5—5 of FIGURE 4 illustrating the lathe charging mechanism and the peeling lathe.

In FIGURE 5, a front elevation view in part section of the lathe charger 20 is shown as it would be seen by one looking from the cradle transfer 14 toward the lathe 60. There are two independent sets of centering mechanisms: one positioned to the left and one to the right. The left-hand set is shown in FIGURE 4 in a side elevation view and comprises a plate 22, which is pivoted about the main pivot shaft 23, which is attached to the lathe 60 through lathe bearing supports 61 and 62, as shown in FIGURE 5. The first caliper arm 26 pivots about secondary pivot shaft 24 which is supported at the lower end of plate 22. The second caliper arm 28 is pivoted about closing pivot shaft 31 which is likewise supported by plate 22. In addition, closing arm 30 is pivoted about closing pivot shaft 31. Shafts 23, 24 and 31 are all parallel to lathe axis Z.

Since the arms 26, 28 and 30 operate independently from the arms 25, 27 and 29, as will be described later, it is possible to independently position one end of the log having a larger diameter about the standard axis X while at the same time with the other set of arms center the other end of the log having a smaller diameter about the same standard axis X. With reference to FIGURE 5, the right lathe spindle 63 holds the right end of the log 2 while the left spindle 64 engages and holds the left end of the log 2. Since the logs are generally tapered, it has been found desirable to independently center one end of the log from the other. Just where the grasping points for the independent centering means are established, it is determined by experience with the particular types of logs being used. Our experience has demonstrated that maximum useful veneer yield results are obtained when the right set of centering arms 25, 27 and 29 is positioned to hold the log approximately ⅓ of the length of the log 2 from the right spindle 63 of the lathe 60, and the left set of centering arm 26, 28 and 30 is positioned ⅓ the length of the log 2 from the right spindle 64. Experience with more distorted logs may show that more useful veneer can be produced if the centering arms are positioned closer or farther away from the spindles 63 and 64.

With reference to FIGURES 4 and 5, the movement of the first caliper arm 26 about pivot 24 is made equal and opposite to the movement of second caliper arm 28 about pivot 31 by means of interconnecting link 46 which is pivotally attached to arm 48 which is secured through torque tube 50 to first caliper arm 26. At the other end interconnecting link 46 is pivotally connected to arm 52 which is secured through torque tube 54 to second caliper arm 28. As shown, the interconnecting link 46 is adjustable in length to provide easy adjustments during installation. If link 46 is lengthened, the axis X is lowered. If link 46 is shortened, the axis X is raised. For more accurate positioning of caliper arm 26 with respect to caliper arm 28, it would be possible, using well known engineer practices, to develop a gear train or chain drive with sprockets mounted in the place of link 46 and arms 48 and 52. However, the accuracy of interconnecting link 46 and arms 48 and 52 is sufficient for purposes of handling logs.

With continued reference to FIGURE 5, particularly to the right-hand side, there is seen a similar interconnecting link 45 between arms 47 and 51 which are connected and secured through torque tubes 49 and 53. Torque tubes 49, 50 and 53, 54 are mounted for rotation about secondary pivot shaft 24 and closing shaft 31 respectively.

With reference to FIGURE 4, the caliper arms 26 and 28 are moved toward and away from each other by means of a caliper arm motor 56 which is pivotally secured to arm 58 which is fixed to torque tube 54 and at the other end is secured to arm 82 which is secured to and rotates with main pivot shaft 23. Thus as the motor 56 is expanded arm 58 causes the torque tube 54 to rotate in a clockwise direction about shaft 31 causing second caliper arm 28 to rotate in a clockwise direction. Through the action of the interconnecting link 46, first caliper arm 26 operates in a counterclockwise direction. The reverse motion results from the collapsing of caliper arm motor 56. A similar operation is obtained in the right-hand set of arms 25, 27 and 29, but for purposes of clarity, motors 55 and 56 have not been shown in FIGURE 5.

With continued reference to FIGURE 4, in order that logs 2 may be loaded between the arms 26, 28 and 30 in a direction from left to right, it is necessary that the arm 30 be movable out of the path of the log as it is thrown from the cradle 16 into the lathe charger 20. This is accomplished by means of a special mechanism which permits the closing arm 30 to be moved through part of its rotation without relation to the movement of caliper arms 26 and 28, and through the charging phase of its movement, closing arm 30 is directly tied to the movement of caliper arms 26 and 28. With reference to FIGURES 4 and 5, this mechanism will now be described. It should be noted that closing arm 30 is free to rotate about closing pivot shaft 31, and it is not connected to torque tube 54. An extension 84 is connected between the body of closing arm 30 near the pivot shaft 31 and is connected to one end of a stability tube 86 which at the other end is connected to a link arm 88. Link arm 88 is pivotable about shaft 31 and is pivotally connected to a collapsing linkage 90 which in turn is pivotally connected at the other end to arm 92 which is secured to torque tube 50. Closing arm motor 94 is pivotally mounted through brackets 96 to main shaft 23 and is also pivotally connected through linkage 98 to stability tube 86. Thus, as shown in FIGURE 4, when the closing arm motor 94 is expanded, it forces the stability tube 86 to rotate about the pivot 31 so that arm 30 rotates in the direction of the arrow toward the caliper arms 26 and 28 expanding the collapsible link 90. As soon as the collapsible link 90 has reached its limit of expansion, all three arms 26, 28 and 30 operate together. Similarly, closing arm 29 is connected through extension 83 to stability tube 85 and thence through link 87, collapsing linkage 89 and arm 91, to torque tube 49. Closing motor 93, which is pivotally mounted on main shaft 23 by means of brackets 95, operates through linkage 97 to rotate stability tube 85 about pivot 31.

Collapsible links 89 and 90 can be adjusted for their limit of expansion to provide minor adjustments of axis X during installation. If the limit of expansion is lengthened, the axis X is moved closer to the lathe knife assembly 70. If the limit of expansion is shortened, the axis X is moved away from the lathe knife assembly 70. Thus, it is possible to adjust the axis X whenever it is out of adjustment by adjusting the length of links 45, 46 and 89, 90.

The relationship between the caliper arm motors 55 and 56 and the closing arm motors 93 and 94 is such that the closing arm motors 93 and 94 can overcome the force of the caliper arm motors 55 and 56 so that as the closing arms 29 and 30 press down upon the surface of the object to be centered through the action of the closing motors 93 and 94, they cause the caliper arms 25 and 27, and 26 and 28 to open. This occurs even against the force of the caliper arm motors 55 and 56, until the collapsing linkages 89 and 90 have reached their maximum point of expansion, at which time the contact points of each set of arms 25, 27, 29 and 26, 28, 30 are equidistant from the standard axis X.

Alternatively, this action can be produced by a gradual release of the pressure of the caliper motors 55 and 56 as soon as the closing arm motors 93 and 94 are energized to close arms 29 and 30.

With reference to FIGURES 4 and 5, the lathe charger 20 is rotated about the main pivot shaft 23 from left to right by means of main pivot motors 99 and 100 which are pivotally supported at one end by lathe brackets 65 and 66 and at the other end by arms 103 and 104 which are secured to main pivot shaft 23. The lathe knife assembly 70 includes a knife blade 71 which is held against the surface of the log 2 to peel away veneer in the form of a ribbon 72 which passes between the knife blade 71 and the stability member 73.

Figure 6:
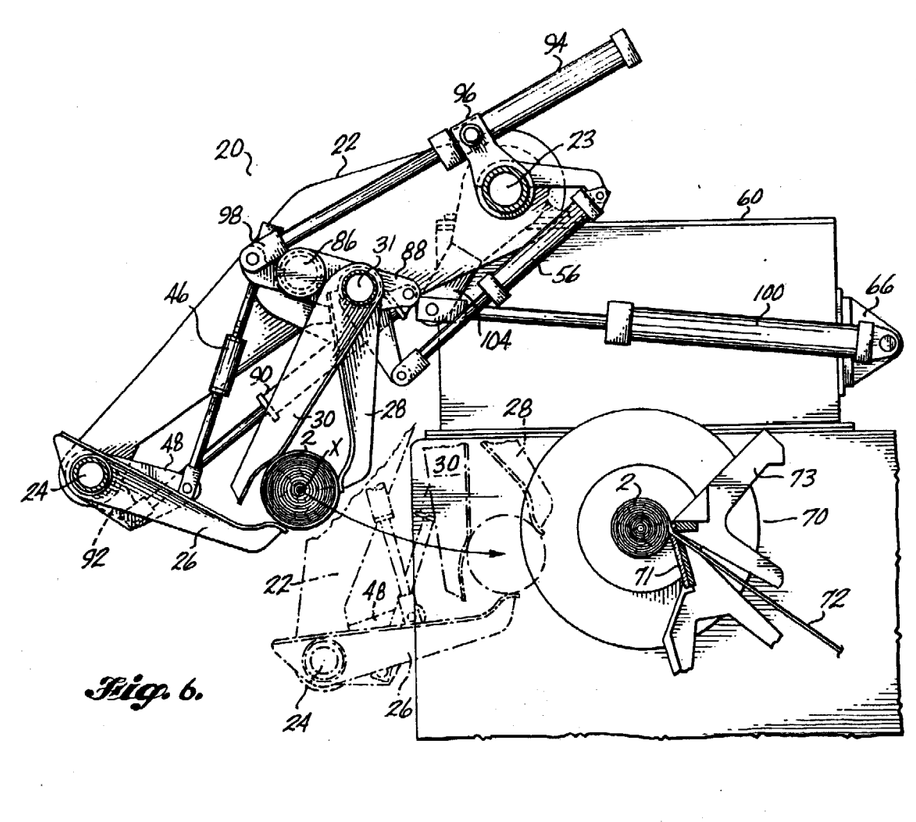
FIGURE 6 is a side elevation view in part section through lines 6—6 of FIGURE 5 with some parts removed showing the lathe charger in solid lines in an intermediate position and in dash lines in a ready-to-charge position.

With reference to FIGURE 6 there is shown the lathe charger 20 in the solid line position where the log 2 is centered about the standard axis X. At this point the closing arm 30 has been brought into contact with the log 2 and, by means of the closing arm motor 94, has forced the caliper arms 26 and 28 to spread apart. The force of motor 94 overcomes the caliper arm motor 56 to the extent necessary until the collapsing linkage 90 becomes expanded as far as it can, at which point the three arms 26, 28 and 30 contact the log 2 at three points separated around its circumference approximately 120° to the accurate precentered position where the center of the log 2 is coincident with the standard axis X. The next position of the log is shown in the dash lines where the plate 22 is caused to rotate about the main pivot shaft 23 due to the action of the motor 100 to place the log 2 in a ready-to-charge position as close as possible to the knife assembly 70 without interfering with the log being peeled. The ready-to-charge position of the charger 20 can be controlled by limit switches which cause the motors 99 nad 100 to stop movement of the charger 20 in space sufficiently remote from the lathe axis Z so that there would be no contact between the log being peeled and the log held in the charger even if both logs were of maximum diameter. The charger operator could also visually position the logs as close as possible without actual contact.

Figures 7, 8:
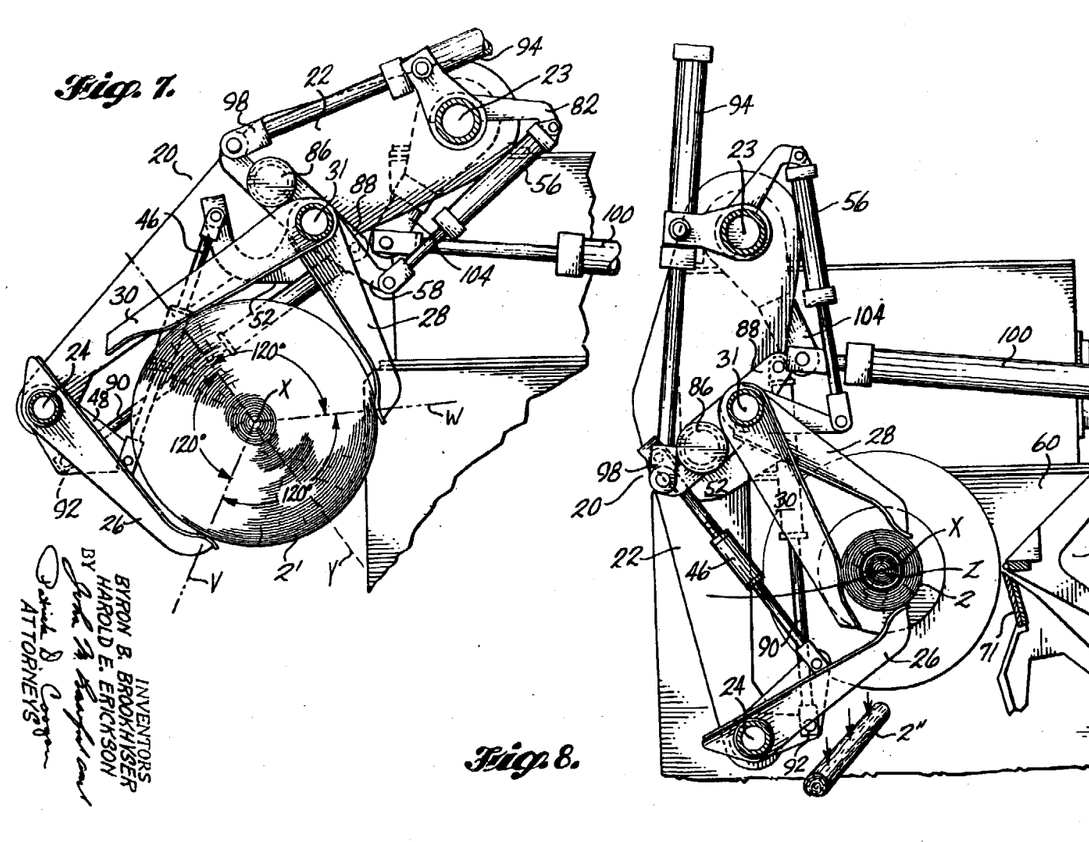
FIGURE 7 is a side elevation view similar to FIGURE 6, except that the log is larger in diameter.
FIGURE 8 is a side elevation view of the lathe charger showing it in final charging position with the center of the log coincident with the axis of the peeling lathe.

FIGURE 7 shows the lathe charger 20 with a larger log 2' centered between the caliper arms 26 and 28 with the closing arm 30 in position where it causes the log to force open the caliper arms 26 and 28, overcoming the caliper arm motor 56 due to the superior force of the closing motor 94. It is noted that the point X is exactly the same place in space as it was with the smaller log 2 in FIGURE 6 and that the collapsing link 90 is at its maximum expanded length which ties the motion of the closing arm 30 with that of the caliper arms 26 and 28. It is possible for the operator to cause the charger 20 to rotate from left to right before the collapsing link 90 is at its maximum expanded length and in such cases the log does not become precentered at the same point in space as is shown in FIGURES 6 and 7.

With reference now to FIGURE 8, there is shown the charging mechanism in its final position where the frame 22 has been moved by motor 100 to position the standard axis X of the log 2 coincident with the axis Z of the lathe 60. At this point it should be noted that the arms 26, 28 and 30 do not damage or otherwise contact the lathe knife assembly 70 while charging the lathe 60. The exact positioning of the lathe charger 20 relative to lathe spindles is simply accomplished by selection of motors 99 and 100, those having a collapsed length which will cause the motors 99 and 100 to bottom when the log axis X is coincident with lathe axis Z. At this position the last log 2" has fallen from the group of the spindles 63 and 64, which have been retracted, and is on its way to the core chute 68. Further, log 2 is in correct position in the lathe 60 so that the spindles may be inserted into the ends of the log, and the peeling assembly 70 can be positioned to peel it. In practice the spindles 63 and 64 may never actually stop rotating.

The operation of the lathe charger 20 can be traced with reference to FIGURES 1, 4, 6 and 8. As shown in FIGURE 1, the log 2 is conveyed up the inclined conveyor 3 to fall into the cradle transfer 14. When the lathe charger is in the position as shown in FIGURE 4 with the closing arm 30 up out of the way, the cradle 16 is pivoted about the cradle pivot 19 through the action of the cradle motor 17 to throw the log 2 from left to right into the cradle formed by the caliper arms 26 and 28, through the action of the caliper arms motor 56. As soon as the log 2 has been ejected from the cradle 16, the closing arm 30, through the action of the closing motor 94, begins to move downwardly toward the log in the direction shown by the arrow in FIGURE 4.

As shown in FIGURE 6 the closing arm 30 continues its rotation through the action of the closing arm motor 94 about the pivot 31 causing the log 2 to force the caliper arms 26 and 28 open until the collapsible linkage 90 can expand no further. At this time the log is contacted at one end by the arms 26, 28 and 30 at three points separated substantially 120° about the circumference of the log 2, and at the other end by arms 25, 27 and 29 at three points separated by substantially 120°. The log 2 is now precentered so that the center of the log at one end is within the grasp of the three arms 26, 28 and 30 and at the other end is within the grasp of arms 25, 27 and 29, so that the log 2 is coincident with the standard axis X. At this time the complete frame 22 of the lathe charger 20 is pivoted from left to right about the main pivot 23 through the action of the main pivot motor 100 to position the log 2 in the ready-to-charge position, as shown in the dash lines in FIGURE 6, to await the completion of the peeling of the log which is held by the spindles 63 and 64 in the lathe 60.

As soon as the log being peeled has been reduced to its smallest practical peeling diameter, the spindles 63 and 64 retract so that the log 2", now referred to as the core, falls down into the core chute 68 to the core handling assembly 75. At the same time, the main pivot motor 100 continues to operate to pivot the lathe charger frame 22 about the main pivot 23 so that the axis X becomes coincident with the axis Z of the lathe 60, and the peeling of the new log can begin as soon as the spindles 63 and 64 have been inserted into the ends of the log so it begins to rotate. Next, the closing arm motor 94 is relaxed as is the caliper motor 56, so that the log is no longer gripped by the arms 26, 28 and 30, and the log is released from the right side of the charger 20 to permit it to start its peeling operation. The main pivot motor 100 is reversed in direction to rotate the frame 22 in the opposite direction about the main pivot 23 from right to left to position it in the loading position adjacent the cradle transfer 14 to receive the next log so that it can be precentered while the log just placed into the lathe is being peeled. In operation, as many as five logs as small as 8" in diameter can be loaded into the lathe each minute.

Thus, it is seen that the disclosed three-point precentering apparatus provides an accurate and quick operating mechanism for remotely precentering logs which pass through it in one direction from a log loading position to a lathe charging position.

It will be obvious to those skilled in the art that various changes may be made in the above described embodiment of the invention without departing from the spirit and scope thereof. Therefore, the invention is not limited by that which is shown in the drawings and described in the specification but only as indicated in the appended claims.

Having thus described our invention, what we claim and desire to protect by Letters Patent is:

1. A means for positioning substantially circular objects so that the axis of said objects is substantially coincident with a standard axis, comprising:

first caliper arm means pivotally connected to a first pivot point and including a first contact point at one end thereof remote from said first pivot point, means to move said first caliper arm means about said first pivot point, said first contact point, when it is moved between contact with a maximum diameter object to contact with a minimum diameter object, describes a first line which, when extended to said standard axis, is substantially 120° away from a standard line emanating outwardly from said standard axis, second caliper arm means pivotally connected to a second pivot point and including a second contact point at one end thereof remote from said second pivot point, means to move said second caliper arm means about said second pivot point, said second contact point, when it is moved between contact with a maximum size object to contact with a minimum size object, describes a second line which, when extended to said standard axis, is substantially 120° away from said standard line in one direction and substantially 120° away from said first line in the other direction, closing means including a closing contact surface providing a third point of contact with said objects which always is positioned along said standard line, interconnecting means operatively connected between said first and second caliper arm means and said closing means to move then toward and away from said standard axis with the distance between said standard axis and said contact points remaining equal, said closing means includes a closing arm pivotally connected at one end to one of said pivot points, a closing motor means for moving said closing arm about its axis, a collapsible linkage means operatively connected between said closing arm and one of said caliper arm means which permits said closing arm to pivot about its axis for part of its range of movement without affecting the positioning of said first and second caliper arm means, and in the remaining portion of its movement directly affecting the position of said first and second caliper arm means.

2. The apparatus of claim 3 wherein said closing motor means has sufficient power to overcome said means for moving said first and second caliper arm means.

3. An apparatus for charging a log peeling lathe with precentered logs, comprising:

lathe means including log spindle means for grasping the ends of logs and rotating them about a lathe axis during a peeling operation.

frame means pivotally mounted to rotate about a main axis parallel to said lathe axis, frame motor means connected between said lathe means and said frame means for moving said frame means between a log loading position and a lathe charging position, a pair of centering arm sets, of three arms each, supported by said frame means and pivotally mounted upon axes parallel to said lathe axis, said centering sets of arms comprising two caliper arms pivotable about two different axes and a closing arm pivotable about one of said axes, each of said arm means including contact means for holding the surface of said logs at points substantially 120° in either direction from the adjacent contact means, arm motor means mounted on said frame means for moving said arm means about their axes, interconnecting means between said caliper arm means and said closing arm means to tie the movement of said caliper arms together at all times and the movement of said closing arm means with said caliper arm means part of the time, said closing arm means movable about its pivot, through the action of said arm motor means, to permit a log to be passed between the axes of said arm means and to swing said closing arm against said log to cause said caliper means to open, through the action of said interconnecting means, until said contact means are separated by substantially 120° to center said log between said arms on an axis parallel to said lathe axis.

4. The apparatus of claim 3 wherein said pair of sets of arm means are positioned between said frame means to grasp said log means at two points, each point being ⅕ the length of the log from its end of the log.

5. The apparatus of claim 3 wherein said arm motor means includes a caliper motor means for positioning said caliper arms about their pivots and a closing motor means for positioning said closing arm about its pivot, said closing motor means being of greater capacity than said caliper motor means so that said closing arm means can force the log against said caliper arm means to open said caliper arm means against the force of said caliper arm motor means.

6. The apparatus of claim 3 wherein said main axis is positioned above said lathe axis to permit peeled logs to drop from said log spindle means without interfering with said frame and arm means.

7. The apparatus of claim 3 wherein said frame motor means reaches one limit of movement when said frame is in said lathe charging position.

8. The apparatus of claim 3 wherein said log is passed through said arm means in the same direction that said frame means moves from said log loading position to said lathe charging position.

References Cited
UNITED STATES PATENTS

| 351,550 | 10/1886 | Weller | 82—45 X |
| 2,523,563 | 9/1950 | Foreman | 144—209 X |
| 3,037,538 | 6/1962 | Graham | 144—209 |

FOREIGN PATENTS

| 567,116 | 5/1958 | Belgium. |
| 619,157 | 3/1961 | Italy. |

DONALD R. SCHRAN, *Primary Examiner.*